May 23, 1967 R. F. RUMRICH 3,320,827
DRIVE FOR A MULTIPLE STAND ROLLING MILL
Filed April 26, 1965

INVENTOR
Roland F. Rumrich

United States Patent Office 3,320,827
Patented May 23, 1967

3,320,827
DRIVE FOR A MULTIPLE STAND
ROLLING MILL
Roland F. Rumrich, Bethel Park, Pa., assignor to Kocks
Pittsburgh Corporation, Pittsburgh, Pa., a corporation
of Pennsylvania
Filed Apr. 26, 1965, Ser. No. 450,771
6 Claims. (Cl. 74—665)

ABSTRACT OF THE DISCLOSURE

A drive for a multiple stand rolling mill in which two gear trains are provided for driving the mill, at least one of the gear trains being operable at variable speed, together with a first differential at each stand of the mill, a driving connection from each first differential to the corresponding stand for driving at least one roll of the stand, connections from each of the gear trains to each first differential for driving the differential at a speed determined by the speeds of the driven gear trains and a second differential and variable speed transmission at each stand interposed in the drive whereby the speed at which such roll is driven by the gear trains may be independently controlled.

---

Figure 1:
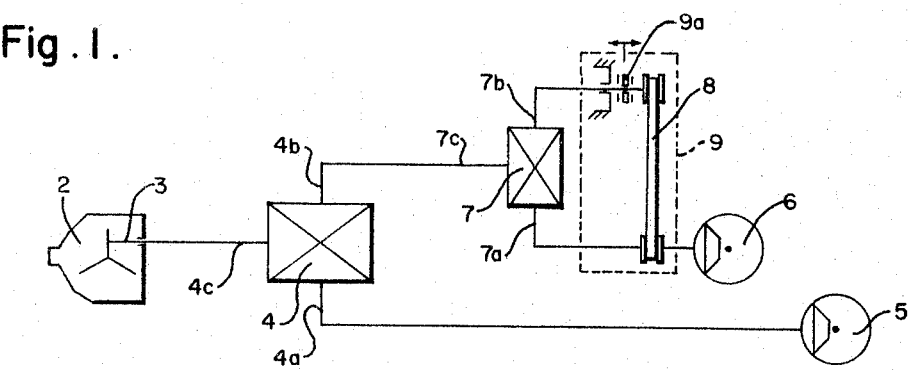

This invention relates to a drive for a multiple stand rolling mill. The drive may be employed in any multiple stand rolling mill but perhaps has especial utility in a multiple stand pipe reducing mill of the general type disclosed in United States Patent No. 2,757,556.

Multiple stand rolling mills, especially pipe reducing mills, can be driven either by providing an individual motor for each stand or by providing a single motor or other power unit and a gear train with appropriate fixed gear ratios for the respective stands. It has heretofore been proposed to controllably adjust the speed at which the rolls are driven to meet particular conditions of operation. There have been provided two types of drive for multiple stand mills which employ differential driving connections between gear train and rolls. In one type the roll speed derived from a fixed gear train is varied for the respective stands through addition or subtraction of a controlled overlap speed of an auxiliary drive operating through a differential for each stand. This type is known as individual overlap drive. In another type the speed derived from a fixed gear train is varied through another fixed gear train, the gear trains acting through differentials at the respective stands to drive the rolls. This type is known as centralized overlap drive.

The individual overlap drive has the advantage that the speed of any roll stand may be adjusted independently of the speed of any other roll stand which has particular utility in the last or sizing stands to conform to elongation and tension conditions, particularly in pipe mills. Such adjustment cannot be achieved with a centralized overlap drive.

Accurate speed adjustment is found not to be necessary in practice when relatively small reductions per stand are effected. For relatively great reductions, however, when more than two or three sizing stands are required for approaching the ultimate shape of the rolled product (round in the case of pipe which may be stretch reduced) precise speed adjustment is highly desirable and advantageous.

My drive for a multiple stand rolling mill desirably comprises two gear trains with fixed gear ratios for the respective stands, at least one of the gear trains being operable at variable speed, with a differential arrangement between the gear trains and each roll stand. One of the gear trains, which need not be operable at variable speed, drives through a second differential connected with the first differential so that the overlap speed of the output shaft of the second differential can be varied by a variable speed transmission such, for example, as a PIV. The variable speed transmission is driven by the input or output shaft of the first differential or from the gear trains. Such a drive provides for varying the speed of each stand individually or for simultaneously adjusting the speed of all of the stands through the centralized overlap drive, adjusting to desired elongation and longitudinal tension between stands for pipe at fixed pass diameter. Means are preferably provided whereby during operation of the drive the output speed of the variable speed transmission may be zero. Thus the variable speed transmission may be employed selectively for sizing stands, being inoperative for breakdown stands. It is not necessary to employ my invention on every stand since satisfactory operation of the first or last stands may be accomplished without it. A special case arises when the variable speed transmission operates on the second differential being driven by the output shaft of the first differential which is equivalent to the speed of the roll stand. The speed increment to the preceding stand depends very little upon the speed of the variable speed drive which may be replaced by a fixed gear drive with interchangeable gears.

I provide a drive for a multiple stand rolling mill comprising two driven gear trains for driving the mill at least one of which is operable at variable speed, a first differential at each stand, a driving connection from each first differential to the corresponding stand for driving at some one roll of the stand, connections from each of the driven gear trains to each first differential for driving the differential at a speed determined by the speeds of the driven gear trains and a second differential and variable speed transmission at each stand interposed in the drive whereby the speed at which such roll is driven by the driven gear train may be independently controlled. More than one roll of each stand may be driven by the interposition of appropriate gearing as well known to those skilled in the art.

Other details, objects and advantages of the invention will become apparent as the following description of certain present preferred embodiments thereof proceeds.

In the accompanying drawings I have shown certain present preferred embodiments of the invention in which FIGURES 1, 2, 3 and 4 are respectively diagrams of drives for a multiple stand rolling mill embodying my invention.

Referring now more particularly to the drawings and first to FIGURE 1, a roll stand of a multiple stand rolling mill is indicated diagrammatically at 2. The drive shaft for driving at least one roll of the roll stand 2 is designated 3. The drive shaft 3 is driven by the output shaft 4c of a first differential 4. One input shaft 4a of the first differential 4 is driven by a first driven gear train 5 which may be operable either at constant speed or at variable speed. A second driven gear train 6 is operable at variable speed. It drives one input shaft 7a of the second differential 7. It also drives through a variable speed transmission 9 including an endless driving element 8 the opposite input shaft 7b of the second differential 7. The input shaft 4b of the first differential 4 opposite the input shaft 4a which is driven by the driven gear train 5 is driven by the output shaft 7c of the second differential 7.

Figure 2:
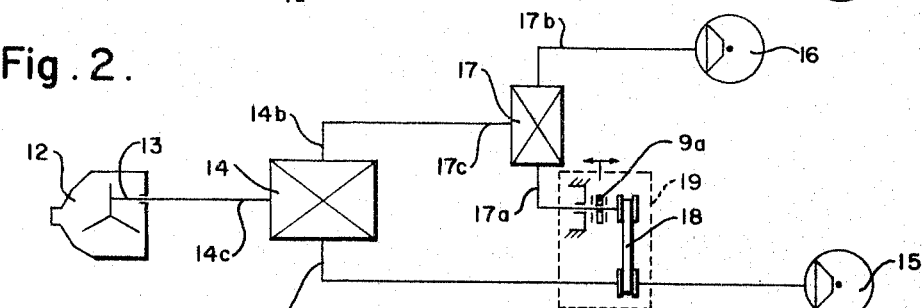

Referring now to FIGURE 2, a roll stand of a multiple stand rolling mill is indicated diagrammatically at 12. The drive shaft for driving at least one roll of the roll stand 12 is designated 13. The drive shaft 13 is driven by the output shaft 14c of a first differential 14. One input shaft 14a of the first differential 14 is driven by a first driven gear train 15 which may be operable either at onstant speed or at variable speed. A second driven gear train 16 is operable at variable speed. It drives one input shaft 17b of the second differential 17. The opposite input shaft 17a of the second differential 17 is driven by the first driven gear train 15 through a variable speed transmission 19 including an endless driving element 18. The input shaft 14b of the first differential 14 opposite the input shaft 14a which is driven by the driven gear train 15 is driven by the output shaft 17c of the second differential 17.

Figure 3:
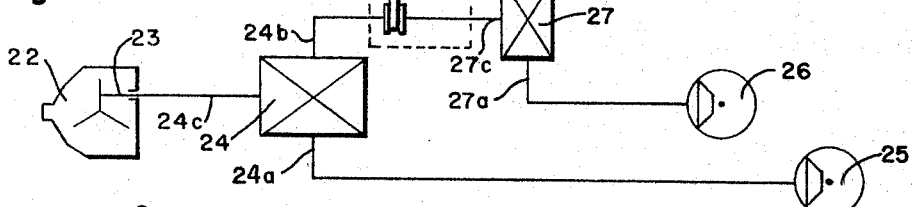

Referring now to FIGURE 3, a roll stand of a multiple stand rolling mill is indicated diagrammatically at 22. The drive shaft for driving at least one roll of the roll stand 22 is designated 23. The drive shaft 23 is driven by the output shaft 24c of the first differential 24. One input shaft 24a of the first differential 24 is driven by a first driven gear train 25 which may be operable either at constant speed or at variable speed. A second driven gear train 26 is operable at variable speed. It drives one input shaft 27a of the second differential 27. The opposite input shaft 27b of the second differential 27 is driven by the output shaft 27c of the second differential 27 through a variable speed transmission 29 including an endless driving element 28. The input shaft 24b of the first differential 24 opposite the input shaft 24a which is driven by the driven gear train 25 is driven by the output shaft 27c of the second differential 27.

Figure 4:
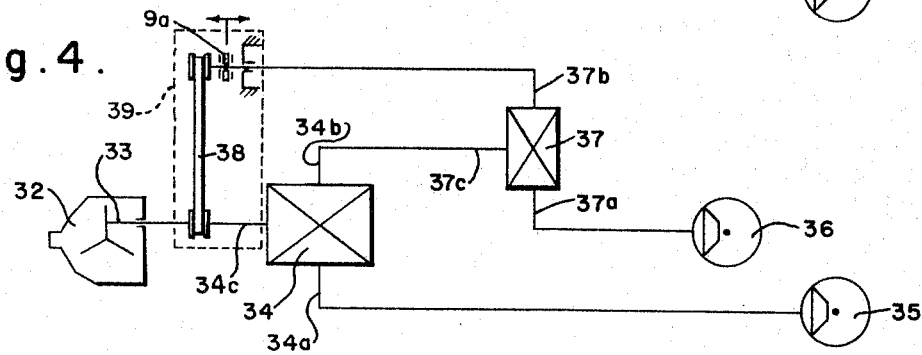

Referring now to FIGURE 4, a roll stand of a multiple stand rolling mill is indicated diagrammatically at 32. The drive shaft for driving at least one roll of the roll stand 32 is designated 33. The drive shaft 33 is driven by the output shaft 34c of a first differential 34. One input shaft 34a of the first differential 34 is driven by a first driven gear train 35 which may be operable either at constant speed or at variable speed. A second driven gear train 36 is operable at variable speed. It drives one input shaft 37a of the second differential 37. The opposite input shaft 37b of the second differential 37 is driven by the output shaft 34c of the first differential 34 through a variable speed transmission 39 including an endless driving element 38. The input shaft 34b of the first differential 34 opposite the input shaft 34a which is driven by the driven gear train 35 is driven by the output shaft 37c of the second differential 37.

Thus the speed of all of the roll stands may be adjusted in the same way as by a centralized overlap drive; the variable speed transmission may have provision for driving its output shaft at zero speed. A clutch 9a may be provided if desired for rendering the variable speed transmission inoperative at desired times. However when speed adjustments are to be made to individual roll stands this is done by adjusting the variable speed drives of those particular roll stands. In this way an unlimited number of characteristics may be imparted to the rolling mill drive adapting the mill for the rolling of a wide variety of products.

While I have shown and described certain present preferred embodiments of the invention it is to be distinctly understood that the invention is not limited thereto but may be otherwise variously embodied within the scope of the following claims.

I claim:

1. A drive for a multiple stand rolling mill comprising two driven gear trains for driving the mill, at least one of which is operable at variable speed, a first differential at each stand, a driving connection from each first differential to the corresponding stand for driving at least one roll of the stand, connections from each of the driven gear trains to each first differential for driving the differential at a speed determined by the speeds of the driven gear trains and a second differential and variable speed transmission at each stand interposed in the drive whereby the speed at which such roll is driven by the driven gear trains may be independently controlled.

2. A drive as claimed in claim 1 in which means are provided whereby during operation of the drive the output speed of the variable speed transmission may be zero.

3. A drive as claimed in claim 1 in which one input shaft of the second differential is driven by one of the driven gear trains, the opposite input shaft of the second differential is driven through the variable speed transmission by the same one of the driven gear trains, one input shaft of the first differential is driven by the other of the driven gear trains, the opposite input shaft of the first differential is driven by the output shaft of the second differential and the roll is driven by the output shaft of the first differential.

4. A drive as claimed in claim 1 in which one input shaft of the second differential is driven by one of the driven gear trains, the opposite input shaft of the second differential is driven through the variable speed transmission by the other of the driven gear trains, one input shaft of the first differential is driven by the second mentioned driven gear train, the opposite input shaft of the first differential is driven by the output shaft of the second differential and the roll is driven by the output shaft of the first differential.

5. A drive as claimed in claim 1 in which one input shaft of the second differential is driven by one of the driven gear trains, one input shaft of the first differential is driven by the other of the driven gear trains, the opposite input shaft of the second differential is driven through the variable speed transmission by the output shaft of the second differential, the opposite input shaft of the first differential is driven by the output shaft of the second differential and the roll is driven by the output shaft of the first differential.

6. A drive as claimed in claim 1 in which one input shaft of the second differential is driven by one of the driven gear trains, one input shaft of the first differential is driven by the other of the driven gear trains, the opposite input shaft of the second differential is driven through the variable speed transmission by the output shaft of the first differential, the opposite input shaft of the first differential is driven by the output shaft of the second differential and the roll is driven by the output shaft of the first differential.

References Cited by the Examiner

UNITED STATES PATENTS

| 2,144,307 | 1/1939 | Hallden | 74—689 |
| 2,384,776 | 9/1945 | Trofimov | 74—675 |
| 2,496,977 | 2/1950 | Bechle | 74—689 |
| 2,647,417 | 8/1953 | Trofimov | 74—689 |

FRED C. MATTERN, JR., *Primary Examiner.*

DAVID J. WILLIAMOWSKY, *Examiner.*

C. J. HUSAR, *Assistant Examiner.*

UNITED STATES PATENT OFFICE
CERTIFICATE OF CORRECTION

Patent No. 3,320,827                          May 23, 1967

Roland F. Rumrich

It is hereby certified that error appears in the above numbered patent requiring correction and that the said Letters Patent should read as corrected below.

Column 2, line 30, for "some" read -- least --.

Signed and sealed this 14th day of November 1967.

(SEAL)
Attest:

Edward M. Fletcher, Jr.                       EDWARD J. BRENNER
Attesting Officer                              Commissioner of Patents